United States Patent [19]

Wicks

[11] Patent Number: 4,763,487

[45] Date of Patent: Aug. 16, 1988

[54] GATE CONTROL APPARATUS FOR REFRIGERATED CARGO CONTAINER

[75] Inventor: Robert G. Wicks, Clay, N.Y.

[73] Assignee: Ralph W. Earl Company, Inc., Syracuse, N.Y.

[21] Appl. No.: 45,534

[22] Filed: May 4, 1987

[51] Int. Cl.[4] .............................................. B60H 1/32
[52] U.S. Cl. ...................................... 62/239; 60/486; 62/323.1; 414/558
[58] Field of Search ................ 60/486; 62/323.1, 239, 62/331; 414/556–558; 280/166

[56] References Cited

U.S. PATENT DOCUMENTS

| 2,914,908 | 12/1959 | Memmel | 60/486 X |
| 2,916,880 | 12/1959 | Hann | 60/486 X |
| 4,078,676 | 3/1978 | Mortenson | 414/558 |
| 4,220,015 | 9/1980 | Johansing, Jr. | 62/331 |
| 4,424,673 | 1/1984 | Polanski et al. | 60/486 |
| 4,561,250 | 12/1985 | Aoyagi et al. | 60/486 X |

Primary Examiner—William E. Tapolcai, Jr.
Attorney, Agent, or Firm—Wall and Roehrig

[57] ABSTRACT

A refrigerated mobile cargo container having side and rear platforms for loading and unloading cargo and hydraulic control valves for regulating the raising and lowering of the platforms. Fluid to the control valves can be supplied from either a primary pump system powered by the refrigeration unit prime mover or by a secondary pump system powered by a twelve volt power supply. Each pump system has its own fluid reservoir. Check valves are provided which prevent the fluid from one pump system from being passed into the other pump system.

8 Claims, 2 Drawing Sheets

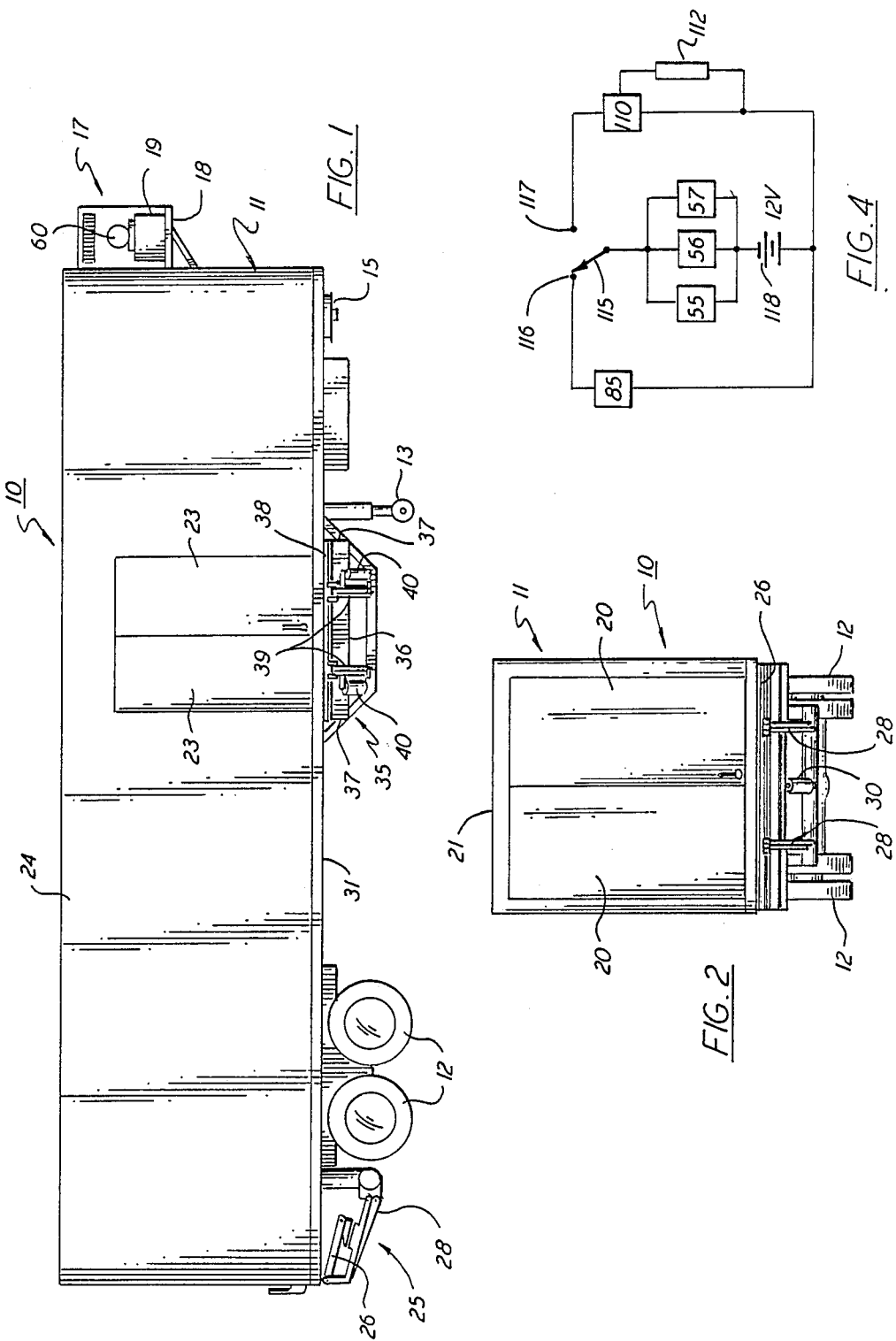

GATE CONTROL APPARATUS FOR REFRIGERATED CARGO CONTAINER

BACKGROUND OF THE INVENTION

The invention relates to a refrigerated mobile cargo container and in particular, to a hydraulic control system for operating the rear and side gates of such a container to facilitate the loading and unloading of cargo.

Many mobile cargo containers are equipped with both side and rear gate units having hydraulically actuated elevators or platforms that are selectively raised and/or lowered to help in the loading and unloading of cargo. The hydraulic system used to control the gates in earlier units typically included an electric pump that was driven from any available 12 volt power supply of the type used in the automotive industry. Later, it was found that the diesel engine used to drive the air conditioner in refrigerated units could also be used to power the hydraulics used to actuate the gates. Two separate and complete hydraulic systems may therefore be found on some refrigerated units. The use of two independent hydraulic systems, however, is relatively expensive because many of the component parts are duplicated in the two systems. Efforts to combine the systems in order to eliminate duplication of parts have for the most part been proven to be relatively unsuccessful.

SUMMARY OF THE INVENTION

It is therefore an object of the present invention to improve refrigerated mobile cargo containers that have hydraulically operated gates used to load and unload the cargo.

It is a further object of the present invention to provide a hydraulic system for operating the rear and side gates of a refrigerated mobile cargo container having a single hydraulic control section that can be independently serviced by one of two available pumps. Each pump is isolated from the other so that loss of fluid in one pump circuit will not adversely effect the operation of the other pump.

Another object of the present invention is to power the hydraulic actuated gate controls of a refrigerated mobile cargo container by either a primary pump driven by the prime mover of a refrigeration unit or a secondary pump driven by a suitable electrical power supply.

These and other objects of the present invention are attained in a refrigerated mobile cargo container, that includes hydraulically operated rear and side gates, a single hydraulic control circuit for selectively operating the gates to facilitate the loading and unloading of cargo from the container, a primary pump driven by the prime mover of the refrigeration unit for providing hydraulic fluid under pressure to the control circuit, a secondary pump driven by an electrical power source is also arranged to provide hydraulic fluid under pressure to the control circuit. Electrical gate valves are used to selectively connect one of the pumps to the control circuit when isolating the other pump.

BRIEF DESCRIPTION OF THE DRAWING

For a better understanding of these and other objects of the present invention reference is had to the detailed description of the invention which is to be read in association with the accompanying drawings, wherein:

FIG. 1 is a side elevation of a refrigerated mobile cargo container having hydraulically actuated side and rear gates for facilitating the loading and unloading of cargo from the container;

FIG. 2 is a rear elevation of the mobile cargo container shown in FIG. 1;

FIG. 4 is an electrical diagram showing the electrical system of the present invention.

DESCRIPTION OF THE INVENTION

Figure 3:
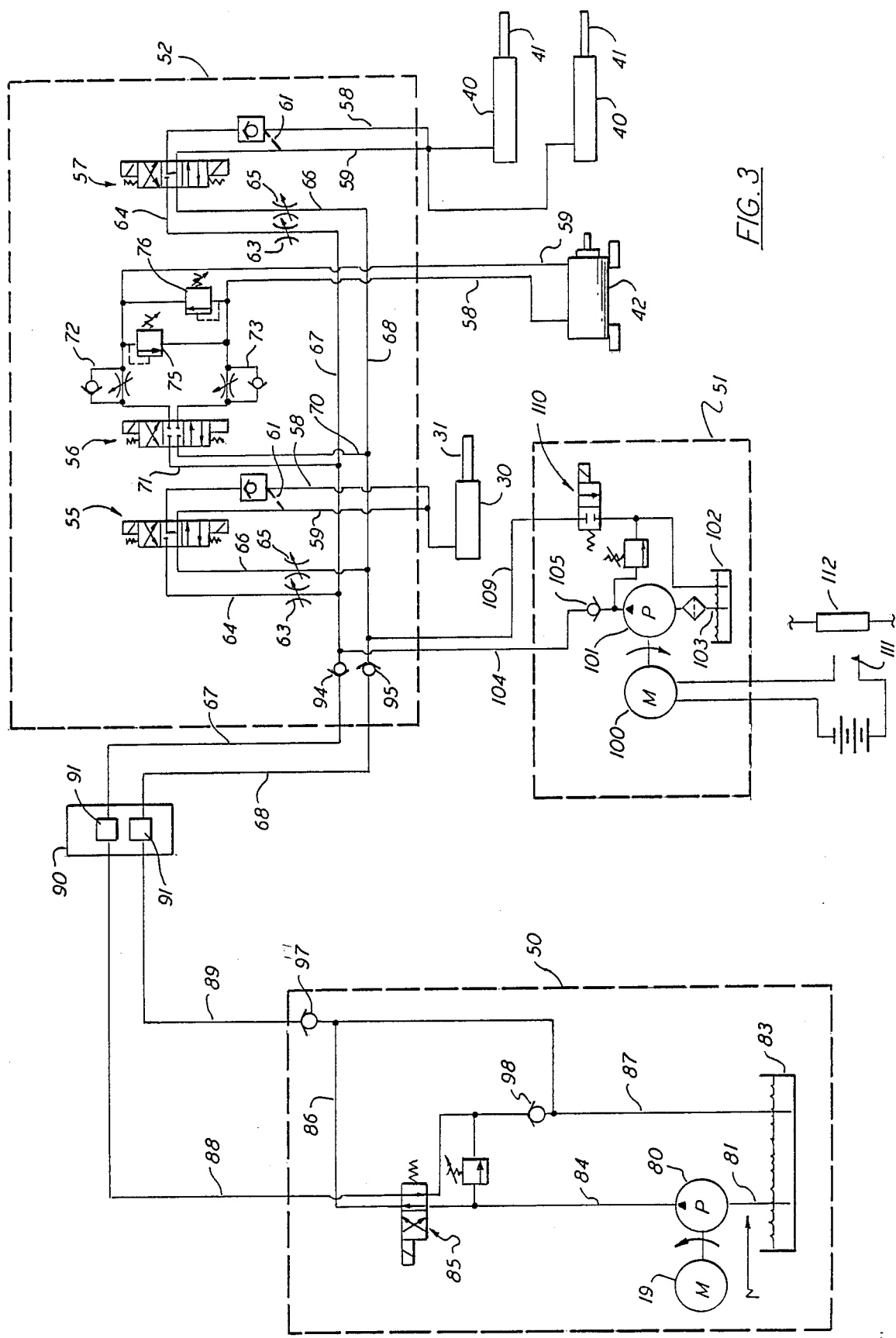
FIG. 3 is a hydraulic diagram showing the component parts of the system for actuating the side and rear gates.

Referring initially to FIGS. 1 and 2 there is shown a mobile cargo container, generally referenced 10, of typical construction. The container consists of an enclosed box 11 mounted upon rear wheels 12—12 and a retractable front support 13. A hitch 15 is mounted at the front of the container by which the container cn be coupled to a tractor (not shown) for transportation from place to place. A refrigeration system 17 is mounted upon a wall bracket 18 upon the upper front wall of the unit that is used to cool the interior of the box for the purpose of preserving perishable goods stored therein. The refrigeration system is driven by a diesel engine 19. Refrigerated containers of this type are well known and readily available through the Transicold Division of Carrier Corporation, Syracuse, N.Y.

Cargo container 10 contains a pair of rear doors 20—20 (FIG. 2) that are hinged in the rear wall 21 of the unit. The doors are arranged to swing outwardly from the container body and provide wide access to the back section of the container. A pair of side doors 23—23 (FIG. 1) are similarly mounted in side wall 24 of the unit and provide access to the forward section of the container.

As is typical in the construction of many mobile cargo containers of this type, retractable gates are provided at the rear and side doors to facilitate the loading and unloading of cargo. The rear gate assembly 25 contains a rear platform 26 that is movably joined to a pair of scissor action control links 28—28. The gate is driven by a single hydraulic cylinder 30 (FIG. 2) that is suspended beneath the bed 31 of the container. The rear gate is shown in a fully retracted position in FIGS. 1 and 2 with the platform stored beneath the bed. As will be explained in greater detail below in reference to FIG. 3, the extendable rod 31 of the drive cylinder 30 is operatively connected to the rear gate platform and is selectively extended and retracted to raise and lower the platform. The path of motion described by the gate is controlled through the linkage 28—28.

A typical side gate assembly 35 services the side doors of the container. Like the rear gate, the side gate is capable of being fully retractable beneath the bed of the container as shown in FIGS. 1 and 2. The side gate assembly includes a carriage 36 that is adapted to ride in horizontal side rails 37—37 attached to the bottom of the bed so that the carriage can be brought laterally from the stored position to an extended position immediately in front of the side doors. The floor of the carriage includes a movable platform 38 that is coupled to a pair or scissor action control links 39—39 and a pair of hydraulic drive cylinders 40—40 (FIG. 1). The linkage and rods 41—41 (FIG. 3) of the the drive cylinders are attached to the carriage and are arranged to move laterally with the carriage between the stored position and the extended position.

In operation, the carriage is moved laterally upon the rails by a hydraulic motor 42 (FIG. 3). Although not shown, the motor is suspended beneath the bed of the container and acts through a chain and sprocket drive system to move the carriage along a horizontal path of travel between the fully extended and the fully retracted positions. After the carriage is moved to the extended position, the drive cylinders are used to raise and lower the side gate platform to facilitate loading and unloading of cargo from the container through the side door. As will be explained in greater detail below the hydraulic motor 42 and the drive cylinders 40—40 are selectively operated to bring the platform to any desired position within the range of the control linkage. The construction of the side gate, like that of the rear gate, is well known in the art and further explanation concerning the operational features of the two gates is not believed necessary for a full understanding of the present invention.

Turning now to FIG. 3 there is shown a hydraulic diagram of the control system used to operate the rear and side gate assemblies of cargo container 10. The system includes a primary pump system 50, a secondary pump system 51, and a hydraulic control circuit 52. The control circuit contains three solenoid actuated three-way valves of conventional design 55-57 that can be selectively actuated to position the rear and side gate units. Valve 55 controls the action of the rear gate cylinder 30; valve 56 controls the action of the hydraulic motor 42 and valve 57 controls the action of the two side gate cylinders 40—40.

When the hydraulic circuit is connected to one of the pump systems, the control one or both gates valves can be selectively cycled to control valves 55 and 57 and normally held in a neutral position as shown when the valves are deenergized. This disconnects the cylinders from the on-line pump and prevents fluid from moving into or out of the cylinder or cylinders. Accordingly, the piston rod of the cylinder is locked in a set position when the connected valve is in a neutral position. Placing any one of the cylinder control valves in an up position connects the associated cylinder or cylinders to the on-line pump and the attached rod is extended to raise the gate platform. Moving a control valve to a down position permits fluid to bleed out of the associated cylinder or cylinders whereupon the platform of the gate falls under its own weight to a lower position.

As illustrated in FIG. 3 the front port of each drive cylinder is plugged and only the rear port is used. The rear port is connected to the associated control valve by a delivery line 58 and a bleed line 59. A check valve 60 is placed in the delivery line which permits fluid to be delivered into the cylinder when the valve is placed in the up position. A pilot line 61 connects the check valve with the bleed line and functions to unseat the valve when the associated valve is moved to the down position thus permitting fluid trapped in the cylinder to bleed back through the valve. A speed control valve 63 is placed in the pressure port line 64 of valves 55 and 57 to regulate the speed at which the rod of the connected cylinder is extended. A similar speed control valve 65 is contained in the relief port line 66 of the valves 55 and 57 to control the speed of the connected cylinder rod. Pressure port lines 64—64 are connected to a common fluid supply line 67 while the relief port lines 66—66 are similarly connected to a common return line 68.

A motor control valve 56 is arranged to bring fluid under pressure to one side of motor 42 via line 58 when the valve is placed on a first drive position whereby the motor turns in first direction to extend the carriage of the side gate. Placing the valve in the neutral position as shown in FIG. 3 prevents fluid from reaching the motor whereupon it ceases to turn. Moving the valve to a second drive position causes fluid under pressure to be delivered to the other side of the motor via line 59 thus causing the motor to turn in the opposite direction to return the carriage to the fully retracted position. Here again the valve is connected to lines 67 and 68 by means of pressure port line 69 and relief port line 70, respectively. Flow controllers 72 and 73 are used to regulate the speed of the motor in both directions. A pair of crossover regulators 75 and 76 are placed in parallel between the motor supply lines 77 and 78 which are adapted to relieve the hydraulic stress on the motor when its direction of rotation is changed by rapid repositioning of the control valve 56.

The primary pump circuit 50 includes a Vickers vane type pump 80 that is connected directly to the diesel motor 19 that powers the refrigeration equipment 17 (FIG. 1). The suction line 81 of the pump is connected to a ten gallon fluid reservoir 83. The pump discharge line 84 contains a two place solenoid actuated gate valve 85 that is normally held in a standby position as shown. When in standby the valve functions to reroute fluid discharged by the pump back to the reservoir via shunt line 86 and the primary pump return line 87.

Valve 85 is attached to the fluid supply line 67 of the control circuit by a first service line 88 while the primary pump return line 87 is similarly attached to the hydraulic circuit return line 68 via a second service line 89. The lines are joined at a manifold block 90 secured to the underside of the cargo container. The block contains a pair of quick disconnect fittings 91—91 which allow the flow circuits to be disconnected when necessary. It should be evident from the disclosure above that the lines connecting the various components of the hydraulic system are relatively long. For the most part the lines are mounted on the ouside of the container and thus subject to damage from road objects and the like which can cause a line to rupture. A pair of one way check valves 94 and 95 are placed in lines 67 and 68 of the control circuit which, as will be explained in greater detail below, serve to isolate the control circuit from the primary pump circuit in the event of a service line rupture.

The solenoid actuated gate valve 85 in the primary pump circuit is adapted to sequence to an open position any time one of the control valves 55-57 is electrically energized. Opening the gate valves provides a flow circuit by which high pressure fluid can be exchanged between the primary pump system and the hydraulic control circuit. A pair of check valves 97 and 98 are contained in the primary pump system which controls the routing of fluid through the pump system.

The secondary pump system 51 contains a small 12 volt electrical motor 100 that is connected to a secondary pump 101. The pump contains its own two gallon fluid reservoir 102 that is connected to the pump inlet by a suction line 103. The pump discharge line 104 of the secondary pump is connected directly to the supply line 67 of the hydraulic control circuit immediately behind the check valve 94. A check valve 105 is placed in the pump discharge line 104 to insure that the discharged fluid moves in one direction only. The return line 68 of the control circuit is connected to the secondary pump fluid reservoir by means of secondary return line 109. A solenoid actuated gate valve 110 is positioned in the return line. The gate valve is a two position valve that is normally in the off position as shown when the valve is deenergized. The valve, however, can be energized manually by the operator in the event the primary system fails.

Turning now to FIG. 4, there is shown an electrical diagram showing circuitry for manually switching from the primary pump to the secondary pump. Control valves 55-57 are connected in parallel to one side of a 12 volt D.C. power supply 116. A manually operated contact 115 is placed in the circuit through which a current path is provided back to the other side of the power supply. The switch contact can be manually positioned between two terminals 116 and 117. When the contact is closed against contact 116, the gate valve 85 in the primary pump system and the three control valves 55-57 are all energized and thus capable of being electrically sequenced. Through use of appropriate relays, (not shown) the primary pump gate valve 85 is arranged to be opened any time one of the three control valves is moved to an active position. Closing the contact 115 against terminal 117 electrically removes the gate valve 85 from the circuit and places the secondary pump gate valve 110 in series with the power supply. Again, energizing one of the control valves 55-57 opens the gate valve 110 and causes a relay 112 to be energized. The energized delay closes a contact thus starting the secondary pump motor when the gate valve is opened.

Check valve 95 mounted in the hydraulic circuit return line 68 is preset to open at about 65 pounds of pressure or at some suitable pressure that is higher than the fluid pressure found in line 109. Accordingly, any time the secondary pump is operating the fluid circulated through the control circuit will be automatically returned to the secondary reservoir. In the event a hydraulic line ruptures at a point beyond check valves 94 and 95 the rupture will be completely isolated and the gate will continue to function. Similarly, if for some reason cooling of the container is not required, the operator can shut the unit down while still maintaining the freedom to use the electrical pump to raise and lower the gates.

While this invention has been described in detail with reference to a preferred embodiment, it should be understood that many modifications and variations would be apparent to those of skill in the art without departure from the scope and spirit of the invention, as defined in the appended claims.

What is claimed is:

1. Apparatus for controlling rear and side gates of a mobile cargo container that includes
    a refrigeration unit for cooling the container that has a prime mover for driving a refrigeration unit compressor,
    a hydraulic control circuit that includes a plurality of electrically actuated control valves for selectively raising and lowering platforms associated with each of said gates,
    a primary pump system that includes a primary pump driven by said prime mover of the refrigeration unit, and a first normally closed electrically actuated gate valve for connecting the primary pump to the control circuit,
    a secondary system that includes a secondary pump, an electric motor for driving said secondary pump, a second normally closed electrically actuated gate valve for connecting the secondary pump to the control circuit,
    electrical means for applying current to the secondary pump when the second gate valve is opened, and switching means for selectively opening one of said gate valves when one of the control valves is electrically activated.

2. The apparatus of claim 1 wherein said primary pump system further includes a first fluid reservoir, and means to return the discharge from said primary pump to said reservoir when said first gate valve is closed.

3. The apparatus of claim 1 wherein said secondary pump system further includes a relay means for starting the electric motor when said second gate valve is opened and stopping the motor when said second gate valve is closed.

4. The apparatus of claim 3 wherein said secondary pump system further includes a independent fluid reservoir connected to the secondary pump.

5. The apparatus of claim 4 wherein the hydraulic control circuit further includes a supply line and a return line connected to each of the control valves, and check valves in the supply and return lines for isolating the primary pump system from the secondary pump system, whereby fluid in the secondary pump system is prevented from passing into the primary system.

6. Apparatus for controlling the gate of a mobile cargo container that includes
    a refrigeration unit for cooling a cargo container having a prime mover for driving the unit compressor,
    a hydraulic control circuit having electrically actuated control valve means for raising and lowering a platform associated with the gate,
    a primary pump driven by the prime mover of the refrigerator unit,
    a secondary pump driven by an electric motor,
    gate means for selectively connecting one of the pumps to the hydraulic control circuit, and
    check valve means for isolating the primary pump from the secondary pump.

7. The apparatus of claim 6 wherein each pump is connected to an independent fluid reservoir.

8. The apparatus of claim 6 that further includes electrical meaans for automatically turning on the secondary pump motor when said secondary pump is connected to the hydraulic control circuit.

* * * * *